US012776057B2

(12) United States Patent
Dawson

(10) Patent No.: US 12,776,057 B2
(45) Date of Patent: Oct. 27, 2026

(54) FRACTAL-GEOMETRY BASED FINGERPRINT VALUE DETERMINATION FROM MEDIA CONTENT

(71) Applicant: SONY GROUP CORPORATION, Tokyo (JP)

(72) Inventor: Thomas Dawson, Escondido, CA (US)

(73) Assignee: SONY GROUP CORPORATION, Tokyo (JP)

( * ) Notice: Subject to any disclaimer, the term of this patent is extended or adjusted under 35 U.S.C. 154(b) by 457 days.

(21) Appl. No.: 18/342,188

(22) Filed: Jun. 27, 2023

(65) Prior Publication Data

US 2025/0005778 A1 Jan. 2, 2025

(51) Int. Cl.
*G06T 7/60* (2017.01)
*G06T 7/90* (2017.01)

(52) U.S. Cl.
CPC .................. *G06T 7/60* (2013.01); *G06T 7/90* (2017.01); *G06T 2207/10016* (2013.01)

(58) Field of Classification Search
None
See application file for complete search history.

(56) References Cited

U.S. PATENT DOCUMENTS

| | | | | |
|---|---|---|---|---|
| 8,611,689 | B1 | 12/2013 | Yagnik | |
| 2016/0286266 | A1* | 9/2016 | Moshitch | G06V 20/46 |
| 2018/0068410 | A1* | 3/2018 | Pavetic | G06T 7/11 |
| 2019/0286911 | A1* | 9/2019 | Smith | G06V 10/56 |

FOREIGN PATENT DOCUMENTS

| | | | |
|---|---|---|---|
| CN | 112232428 | B | 11/2021 |
| EP | 2549475 | B1 | 7/2019 |

OTHER PUBLICATIONS

Tsai, et al., "Automatic Image Authentication and Recovery Using Fractal Code Embedding and Image Inpainting", Pattern Recognition, vol. 41, No. 2, Feb. 2008, 9 pages.

Sun, et al., "Medical Image Security Authentication Method Based on Wavelet Reconstruction and Fractal Dimension", International Journal of Distributed Sensor Networks, vol. 17, No. 4, Apr. 2021, 9 pages.

(Continued)

*Primary Examiner* — Randolph I Chu
(74) *Attorney, Agent, or Firm* — CHIP LAW GROUP

(57) ABSTRACT

An electronic device and a method for implementation for fractal-geometry based fingerprint value determination from media content is disclosed. The electronic device receives a set of data streams associated with a media content, wherein each data stream of the received set of data streams corresponds to a predefined number of contiguous data chunks of the media content. The electronic device generates a rectangular media frame. The electronic device determines a set of first attributes associated with each contiguous data chunk for each data stream of the received set of data streams. The electronic device selects a sub-region from the generated rectangular media frame, for the corresponding data stream of the received set of data streams. The electronic device determines a fingerprint value associated with the corresponding data stream. The electronic device stores the determined fingerprint value on a storage device associated with the electronic device.

17 Claims, 9 Drawing Sheets

(56) References Cited

OTHER PUBLICATIONS

Https://www.youtube.com/watch?v=pCpLWbHVNhk.

Wang Z et al: "Content-based image retrieval using block-constrained fractal coding and nona-tree decomposition", IEE Proceedings: Vision, Image and Signal Processing, Feb. 18, 2000 )Feb. 18, 2000), pp. 9-15, vol. 147, No. 1, pp. 9-15, XP006014549.

* cited by examiner

FRACTAL-GEOMETRY BASED FINGERPRINT VALUE DETERMINATION FROM MEDIA CONTENT

FIELD

Various embodiments of the disclosure relate to media processing. More specifically, various embodiments of the disclosure relate to fractal-geometry based fingerprint value determination from media content.

BACKGROUND

Advancements in the field of information and communication technology have made a large-scale distribution of media contents feasible and cost effective. The media content may be of various types, such as, image, videos, and the like. It may be appreciated that the media content may be duplicated and/or modified. In an example, the media content may be an image. An original version of the image may be cropped to generate a modified image. Further, in an example, noise may be introduced in the original version of the image to generate a modified image. Thus, a mechanism for determination of an integrity of the media contents may be required to ensure that the media content is not tampered with, especially for mission critical applications, such as, surveillance, security, and legal evidence. Traditional solutions to determine the integrity of the media contents may not be efficient in terms of amount of time required for the integrity check and storage space requirements, especially in case the media contents are large in size.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for fractal-geometry based fingerprint value determination from media content is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
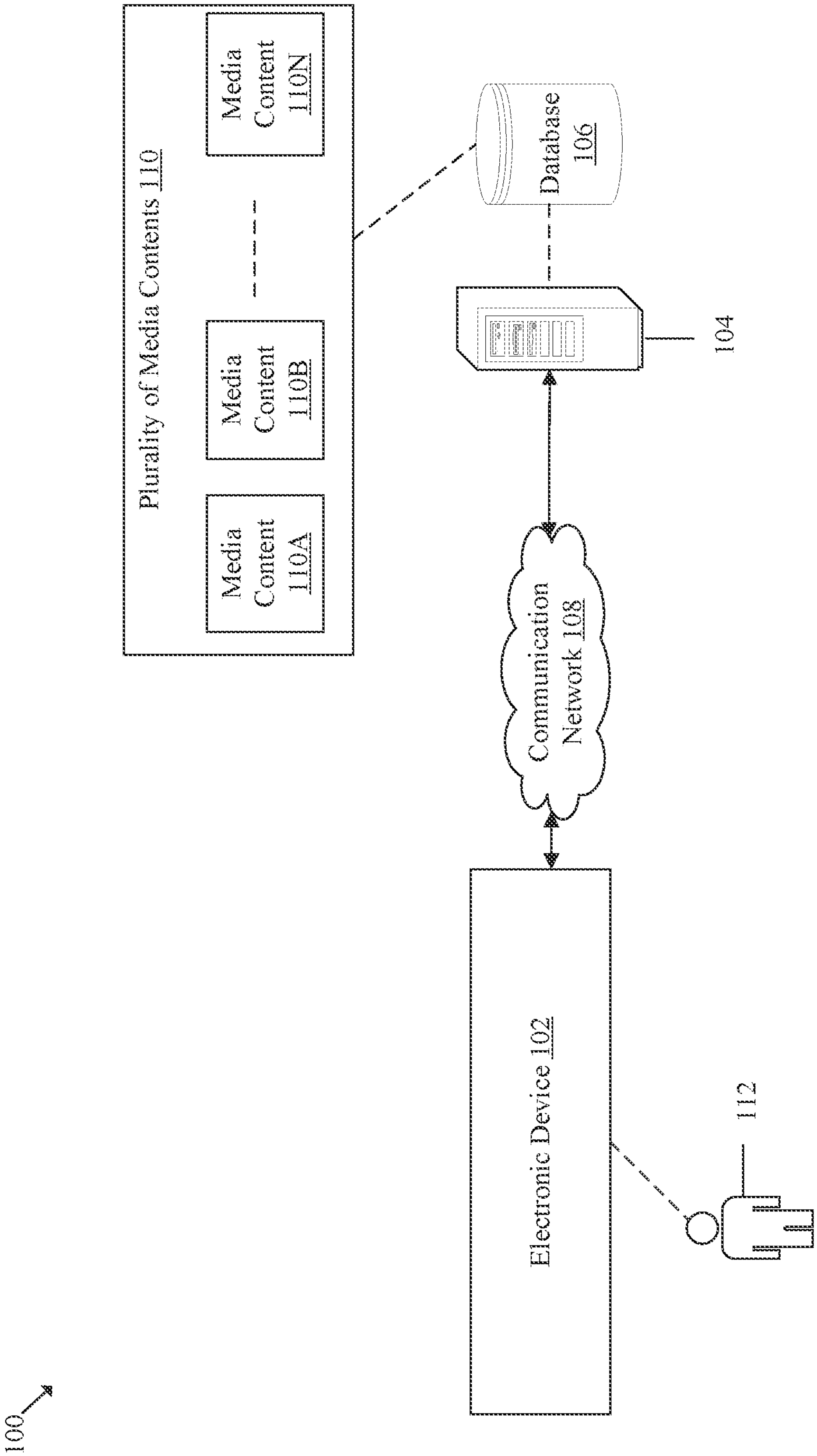
FIG. 1 is a block diagram that illustrates an exemplary network environment for fractal-geometry based fingerprint value determination from media content, in accordance with an embodiment of the disclosure.

The following described implementation may be found in an electronic device and method for fractal-geometry based fingerprint value determination from media content. Exemplary aspects of the disclosure may provide an electronic device that may receive a set of data streams associated with a media content. Each data stream of the received set of data streams may correspond to a predefined number of contiguous data chunks of the media content. The electronic device may generate a rectangular media frame based on the received set of data streams. The electronic device may determine a set of first attributes associated with each contiguous data chunk for each data stream of the received set of data streams. The electronic device may select a sub-region from the generated rectangular media frame, for the corresponding data stream of the received set of data streams, based on the determined set of first attributes. The electronic device may determine a fingerprint value associated with the corresponding data stream of the received set of data streams, based on the selected sub-region for the corresponding data stream. The electronic device may store the determined fingerprint value on a storage device associated with the electronic device.

It may be appreciated that the media content may be duplicated and/or modified. In an example, the media content may be an image. An original version of the image may be cropped to generate a modified image. Further, in an example, noise components may be introduced in an original version of the image to generate a modified image. Thus, a mechanism for determination of an integrity of the media contents may need to be determined. Typically, the image may be verified based on a presence or absence of a predefined watermark in the image. However, such existing methods for determination of an originality of the media contents, such as, the image, may be complex. Traditional solutions to determine the integrity of the media contents may not be efficient in terms of amount of time required for the integrity check and storage space requirements, especially in case the media contents are large in size.

In order to address the aforesaid issues, the disclosed electronic device and method may employ fractal-geometry based fingerprint value determination from media content.

The disclosed electronic device may generate the rectangular media frame based on the received set of data streams associated with the media content. Herein, the media content may be an audio content, a video content, an image content, and a textual content. Thereafter, the disclosed electronic device may determine the set of first attributes associated with each contiguous data chunk for each data stream of the received set of data streams. For example, in case the media content is the image content, then the set of first attributes associated with each contiguous data chunk for each data stream may correspond to a set of color components such as, a red color component, a green color component, and a blue color component. Based on the determined set of first attributes, the sub-region may be selected from the generated rectangular media frame, for the corresponding data stream of the received set of data streams. Upon selection of the sub-region for the corresponding data stream, the disclosed electronic device may determine the fingerprint value associated with the corresponding data stream. The determined fingerprint value may be used to determine whether the media content may has been altered from an original version of the media content. Further, the disclosed method of generation of the fingerprint value may be repeatable. That is, a same fingerprint value may be determined from the corresponding data stream of the received set of data streams even when a process of determination of the fingerprint value is repeated.

In some embodiments, the selected sub-region may correspond to a fractal-geometry associated with the generated rectangular media frame. Thus, the fingerprint value associated with the corresponding data stream of the received set of data streams may be based on a fractal-geometry. In case of the fractal-geometry, if there is even a minute change in the underlying values that make up the fractal-geometry, such change may have a large impact on the determined fingerprint value. Thus, an integrity of the media content may be verified even for a minute change in the media content.

FIG. 1 is a block diagram that illustrates an exemplary network environment for fractal-geometry based fingerprint value determination from media content, in accordance with an embodiment of the disclosure. With reference to FIG. 1, there is shown a network environment 100. The network environment 100 may include an electronic device 102, a server 104, a database 106, and a communication network 108. The electronic device 102 may communicate with the server 104 through one or more networks (such as, a communication network 108). The database 106 may store a plurality of media contents 110. The plurality of media contents 110 may include a media content 110A, a media content 110B, . . . , and a media content 110N. There is further shown, in FIG. 1, a user 112 who may be associated with and/or who may operate the electronic device 102.

Although FIG. 1 shows that the plurality of media contents 110 includes N media contents, the scope of the disclosure may not be so limited. The plurality of media contents 110 may include only two media contents or more than N media contents without departure from the scope of the disclosure.

The electronic device 102 may include suitable logic, circuitry, interfaces, and/or code that may be configured to receive a set of data streams associated with a media content, for example, the media content 110A. Herein, each data stream of the received set of data streams may correspond to a predefined number of contiguous data chunks of the media content 110A. The electronic device 102 may generate a rectangular media frame based on the received set of data streams. The electronic device 102 may determine a set of first attributes associated with each contiguous data chunk for each data stream of the received set of data streams. The electronic device 102 may select a sub-region from the generated rectangular media frame, for the corresponding data stream of the received set of data streams, based on the determined set of first attributes. The electronic device 102 may determine a fingerprint value associated with the corresponding data stream of the received set of data streams, based on the selected sub-region for the corresponding data stream. The electronic device 102 may store the determined fingerprint value on a storage device associated with the electronic device 102.

In an embodiment, the electronic device 102 may be configured to receive a set of pixel streams associated with an image associated with the media content (for example, the media content 110B), wherein each pixel stream of the set of pixel streams corresponds to a predefined number of contiguous pixels of the image. The electronic device 102 may be configured to select a starting location within the received image. The electronic device 102 may be configured to determine a first color component, a second color component, and a third color component associated with the starting location. The electronic device 102 may be configured to select a sub-region for each pixel stream of the received set of pixel streams based on the determined first color component, the determined second color component, and the determined third color component. The electronic device 102 may be configured to determine a fingerprint value associated with the corresponding pixel stream of the received set of pixel streams, based on the selected sub-region for the corresponding pixel stream. The electronic device 102 may be configured to store the determined fingerprint value on the storage device associated with the electronic device 102.

Examples of the electronic device 102 may include, but are not limited to, a computing device, a smartphone, a cellular phone, a mobile phone, a gaming device, a mainframe machine, a server, a computer workstation, a machine learning device (enabled with or hosting, for example, a computing resource, a memory resource, and a networking resource), and/or a consumer electronic (CE) device.

The server 104 may include suitable logic, circuitry, and interfaces, and/or code that may be configured to receive the set of data streams associated with the media content for example, the media content 110A. Herein, each data stream of the received set of data streams may correspond to the predefined number of contiguous data chunks of the media content 110A. The server 104 may generate the rectangular media frame based on the received set of data streams. The server 104 may determine the set of first attributes associated with each contiguous data chunk for each data stream of the received set of data streams. The server 104 may select the sub-region from the generated rectangular media frame, for the corresponding data stream of the received set of data streams, based on the determined set of first attributes. The server 104 may determine the fingerprint value associated with the corresponding data stream of the received set of data streams, based on the selected sub-region for the corresponding data stream. The server 104 may store the determined fingerprint value on the storage device associated with the electronic device 102.

The server 104 may be implemented as a cloud server and may execute operations through web applications, cloud applications, HTTP requests, repository operations, file transfer, and the like. Other example implementations of the server 104 may include, but are not limited to, a database server, a file server, a web server, a media server, an application server, a mainframe server, a machine learning server (enabled with or hosting, for example, a computing resource, a memory resource, and a networking resource), or a cloud computing server.

In at least one embodiment, the server 104 may be implemented as a plurality of distributed cloud-based resources by use of several technologies that are well known to those ordinarily skilled in the art. A person with ordinary skill in the art will understand that the scope of the disclosure may not be limited to the implementation of the server 104 and the electronic device 102, as two separate entities. In certain embodiments, the functionalities of the server 104 can be incorporated in its entirety or at least partially in the electronic device 102 without a departure from the scope of the disclosure. In certain embodiments, the server 104 may host the database 106. Alternatively, the server 104 may be separate from the database 106 and may be communicatively coupled to the database 106.

The database 106 may include suitable logic, interfaces, and/or code that may be configured to store the plurality of media contents 110. The database 106 may be derived from data off a relational or non-relational database, or a set of comma-separated values (csv) files in conventional or big-data storage. The database 106 may be stored or cached on a device, such as a server (e.g., the server 104) or the electronic device 102. The device storing the database 106 may be configured to receive a query for a certain media content (e.g., the media content 110A) from the electronic device 102. In response, the device of the database 106 may be configured to retrieve and provide the queried media content (e.g., the media content 110A) to the electronic device 102, based on the received query.

In some embodiments, the database 106 may be hosted on a plurality of servers stored at the same or different locations. The operations of the database 106 may be executed using hardware including a processor, a microprocessor (e.g., to perform or control performance of one or more operations), a field-programmable gate array (FPGA), or an application-specific integrated circuit (ASIC). In some other instances, the database 106 may be implemented using software.

The communication network 108 may include a communication medium through which the electronic device 102 and the server 104 may communicate with one another. The communication network 108 may be one of a wired connection or a wireless connection. Examples of the communication network 108 may include, but are not limited to, the Internet, a cloud network, Cellular or Wireless Mobile Network (such as Long-Term Evolution and $5^{th}$ Generation (5G) New Radio (NR)), satellite communication system (using, for example, a network of low earth orbit satellites), a Wireless Fidelity (Wi-Fi) network, a Personal Area Network (PAN), a Local Area Network (LAN), or a Metropolitan Area Network (MAN). Various devices in the network environment 100 may be configured to connect to the communication network 108 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

Each media content of the set of media contents may be at least one of an audio content, a video content, an image content, and a textual content. In case, the media content such as, the media content 110B is the video content, then corresponding media content may include a set of video frames that may correspond to a set of still images that may be played sequentially to store the video content.

In operation, the electronic device 102 may be configured to receive the set of data streams associated with the media content 110A, wherein each data stream of the received set of data streams may correspond to the predefined number of contiguous data chunks of the media content 110A. Herein, the media content 110A may be at least one of the audio content, the video content, the image content, and the textual content. The media content 110 may be transmitted in units of data streams associated with the set of data streams. In an example, the media content 110A may be the audio content. Herein, each data stream of the set of data streams may correspond to an audio portion of the audio content, such that a length of the audio portion may be "30" seconds. Details related to reception of the set of streams are further provided, for example, in FIG. 3 (at 302).

The electronic device 102 may be configured to generate the rectangular media frame based on the received set of data streams. Herein, each data stream of the received set of data streams may be arranged in a line associated with the corresponding data stream, so that the rectangular media frame may be generated. Details related to generation of the rectangular media frame are further provided, for example, in FIG. 3 (at 304).

The electronic device 102 may be configured to determine the set of first attributes associated with each contiguous data chunk for each data stream of the received set of data streams. In an example, the media content 110A may be the audio content. Herein, the set of first attributes associated with each contiguous data chunk may be a pitch, a duration, an intensity, and a timbre associated with the audio data associated with the corresponding contiguous data chunk. In another example, the media content 110A may be the video content. Herein, the set of first attributes associated with each contiguous data chunk may be a first color component, a second color component, and third color component. Details related to determination of the set of first attributes are further provided, for example, in FIG. 3 (at 306).

The electronic device 102 may be configured to select the sub-region from the generated rectangular media frame, for the corresponding data stream of the received set of data streams, based on the determined set of first attributes. Herein, the sub-region may a portion within the generated rectangular media frame. Details related to selection of the sub-region are further provided, for example, in FIG. 3 (at 308).

The electronic device 102 may be configured to determine the fingerprint value associated with the corresponding data stream of the received set of data streams, based on the selected sub-region for the corresponding data stream. The fingerprint value may be unique value associated with the corresponding data stream of the received set of data streams. In an example, the fingerprint value associated with the corresponding data stream of the received set of data streams may correspond to last "8" bytes associated with a last "8" data chunks of the selected sub-region. Details related to the determination of the fingerprint value are further provided, for example, in FIG. 3 (at 310).

The electronic device 102 may be configured to store the determined fingerprint value on a storage device associated with the electronic device 102. For example, the determined fingerprint value may be stored on the database 106. Details related to the storage of the fingerprint value are further provided, for example, in FIG. 3 (at 312).

In an embodiment, the electronic device 102 may be configured to receive the set of pixel streams associated with the image associated with the media content 110B, wherein each pixel stream of the set of pixel streams corresponds to the predefined number of contiguous pixels of the image. It may be appreciated that the image may include a plurality of pixels that may be arranged in rows and columns. In an example, each pixel stream of the set of pixel streams associated with the image may be a row of the image. Each row may include the predefined number of contiguous pixels. Details related to reception of the set of pixel streams are further provided, for example, in FIG. 4 (at 402).

The electronic device 102 may be configured to select the starting location within the received image. The starting location may be a reference location based on which the sub-region may be selected. Details related to selection of the starting location are further provided, for example, in FIG. 4 (at 404).

The electronic device 102 may be configured to determine the first color component, the second color component, and the third color component associated with the starting location. It may be appreciated that a color of each pixel may be represented in various color formats such as, a red-green-blue (RGB) format, a hue-lightness-saturation (HLS) format, and the like. The first color component, the second color component, and the third color component associated with the starting location may be determined based on the color format used for representing colors in the image. Details related to determination of the first color component, the second color component, and the third color component are further provided, for example, in FIG. 4 (at 406).

The electronic device 102 may be configured to select the sub-region for each pixel stream of the received set of pixel streams based on the determined first color component, the determined second color component, and the determined third color component. Herein, the sub-region may be at a certain location within the start region. Details related to the selection of the sub-region, for example, in FIG. 4 (at 408).

The electronic device 102 may be configured to determine the fingerprint value associated with the corresponding pixel stream of the received set of pixel streams, based on the selected sub-region for the corresponding pixel stream. The fingerprint value may be a unique value associated with the corresponding pixel stream of the received set of pixel streams. Details related to the determination of the fingerprint value, for example, in FIG. 4 (at 410).

The electronic device 102 may be configured to store the determined fingerprint value on the storage device associated with the electronic device 102. Details related to the storage of the fingerprint value, for example, in FIG. 4 (at 412).

Figure 2:
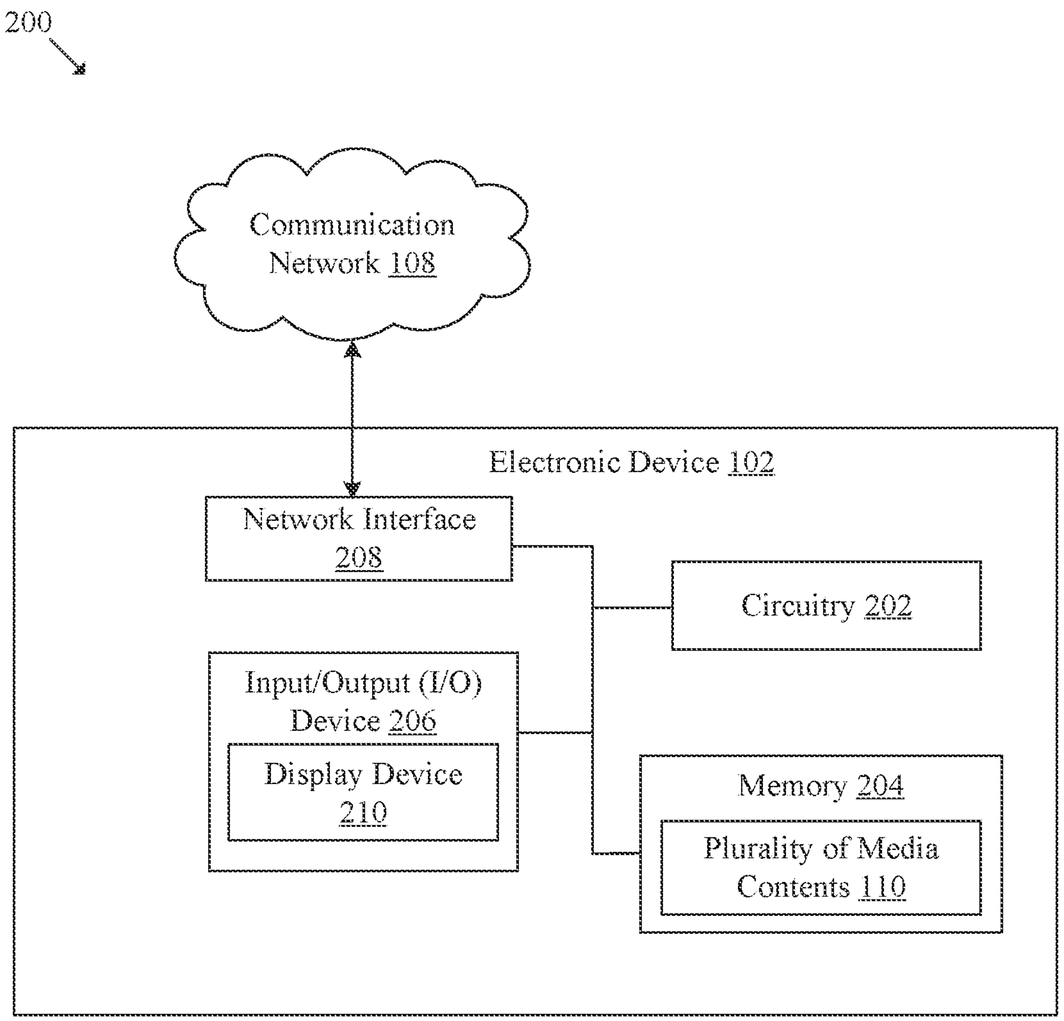
FIG. 2 is a block diagram that illustrates an exemplary electronic device of FIG. 1, in accordance with an embodiment of the disclosure.

FIG. 2 is a block diagram that illustrates an exemplary electronic device of FIG. 1, in accordance with an embodiment of the disclosure. FIG. 2 is explained in conjunction with elements from FIG. 1. With reference to FIG. 2, there is shown the exemplary electronic device 102. The electronic device 102 may include circuitry 202, a memory 204, an input/output (I/O) device 206, and a network interface 208. The memory 204 may store the plurality of media contents 110. The input/output (I/O) device 206 may include a display device 210.

The circuitry 202 may include suitable logic, circuitry, and/or interfaces that may be configured to execute program instructions associated with different operations to be executed by the electronic device 102. The operations may include media content reception, rectangular media frame generation, first attributes determination, sub-region selection, fingerprint value determination, and storing of the determined fingerprint value. The circuitry 202 may include one or more processing units, which may be implemented as a separate processor. In an embodiment, the one or more processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store one or more instructions to be executed by the circuitry 202. The one or more instructions stored in the memory 204 may be configured to execute the different operations of the circuitry 202 (and/or the electronic device 102). The memory 204 may be further configured to store the set of media contents 110. In certain scenarios, the memory 204 may also store the determined fingerprint value. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. For example, the I/O device 206 may receive a first user input indicative of a request for determine of the fingerprint values for the media content 110A. The I/O device 206 may be further configured to display the determined fingerprint value. The I/O device 206 may include the display device 210. Examples of the I/O device 206 may include, but are not limited to, a display (e.g., a touch screen), a keyboard, a mouse, a joystick, a microphone, or a speaker. Examples of the I/O device 206 may further include braille I/O devices, such as, braille keyboards and braille readers.

The network interface 208 may include suitable logic, circuitry, interfaces, and/or code that may be configured to facilitate communication between the electronic device 102 and the server 104, via the communication network 108. The network interface 208 may be implemented by use of various known technologies to support wired or wireless communication of the electronic device 102 with the communication network 108. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), $5^{th}$ Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The display device 210 may include suitable logic, circuitry, and interfaces that may be configured to display the determined fingerprint value. The display device 210 may be a touch screen which may enable a user (e.g., the user 112) to provide a user-input via the display device 210. The touch screen may be at least one of a resistive touch screen, a capacitive touch screen, or a thermal touch screen. The display device 210 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 210 may refer to a display screen of a head mounted device (HMD), a smart-glass device, a see-through display, a projection-based display, an electro-chromic display, or a transparent display. Various operations of the circuitry 202 for fractal-geometry based fingerprint value determination from media content are described further, for example, in FIG. 3 and FIG. 4.

Figure 3:
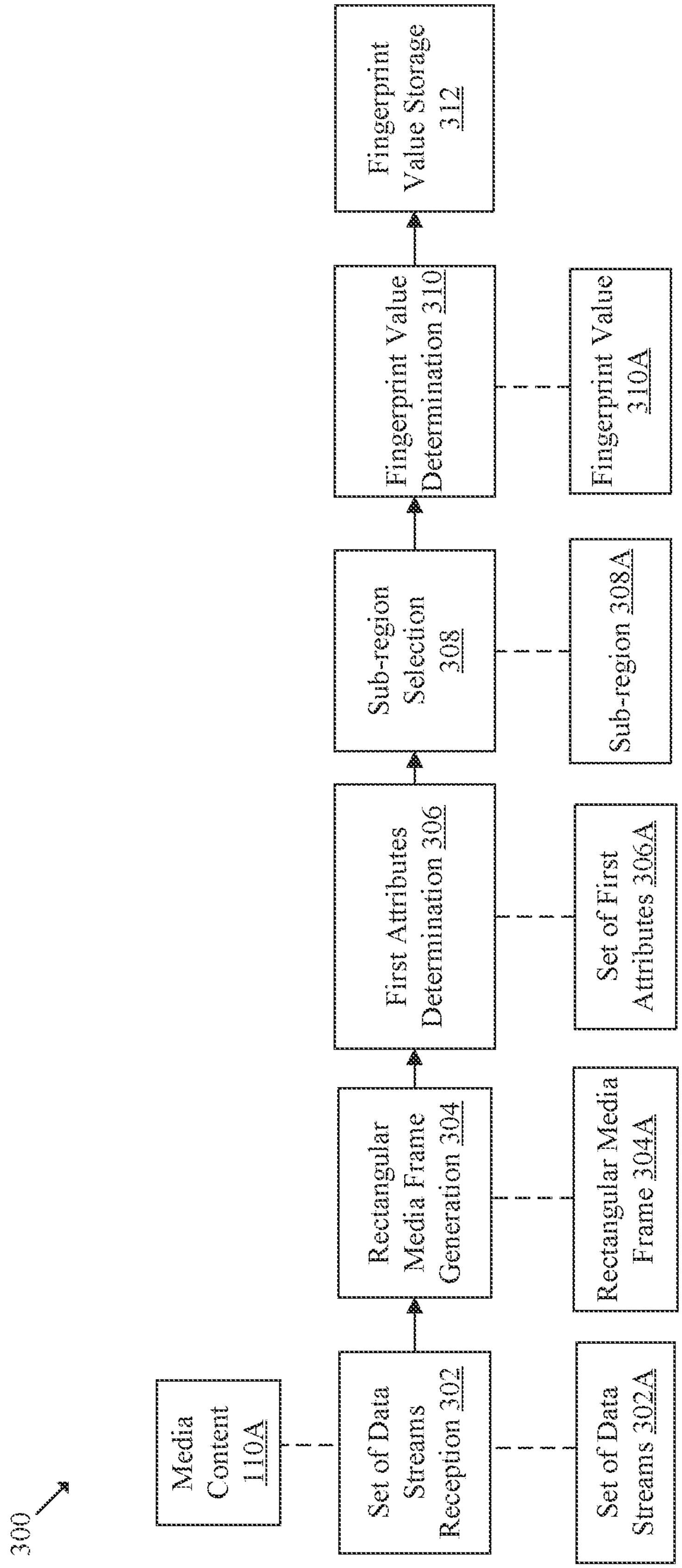
FIG. 3 is a diagram that illustrates an exemplary processing pipeline for fractal-geometry based fingerprint value determination from the media content, in accordance with an embodiment of the disclosure.

FIG. 3 is a diagram that illustrates an exemplary processing pipeline for fractal-geometry based fingerprint value determination from media content, in accordance with an embodiment of the disclosure. FIG. 3 is explained in conjunction with elements from FIG. 1 and FIG. 2. With reference to FIG. 3, there is shown, an exemplary processing pipeline 300 that illustrates exemplary operations from 302 to 312 for fractal-geometry based fingerprint value determination from the media content. The exemplary operations 302 to 312 may be executed by any computing system, for example, by the electronic device 102 of FIG. 1 or by the circuitry 202 of FIG. 2. FIG. 3 further includes the media content 110A, a set of data streams 302A, a rectangular media frame 304A, a set of first attributes 306A, a sub-region 308A, and a fingerprint value 310A.

At 302, an operation of the set of data streams reception may be executed. The circuitry 202 may be configured to receive the set of data streams 302A associated with the media content 110A, wherein each data stream of the received set of data streams 302A may correspond to the predefined number of contiguous data chunks of the media content 110A. The media content 110A may include at least one of an audio content, a video content, an image content, and a textual content. It may be appreciated that the media content 110A may be transmitted in units of data streams. Each data stream may include a certain number of bytes of data associated with the media content 110A.

In an embodiment, the media content 110A may be the audio content. Herein, the audio content may be transmitted in units of the set of data streams 302A. Each data stream may include a set of audio data bytes associated with the audio content. In an example, a length of the audio content may be "30" minutes. The length of the audio content may be divided into a set of first time durations, such that each first time duration may be "10" seconds. For each first time duration, the set of audio data bytes of the audio data associated with the corresponding first time duration may be determined as a data stream. Each data stream may include the predefined number of contiguous data chunks. Herein, the predefined number of contiguous data chunks may correspond to a number of audio data bytes present in each stream. In an example, each data stream may include the set of audio data bytes of the audio data associated with the first time duration of "10" seconds. Further, the set of audio data bytes may be divided into data chunks. Each data chunk may be associated with a plurality of the audio data bytes of the set of audio data bytes associated with a second time duration of "1" second.

In another example, the media content 110A may be the image content. The image content may be transmitted in a form of the set of data streams 302A. Herein, each data stream of the set of data streams 302A may correspond to a line of the image content. Each line of the image content may include the predefined number of contiguous data chunks. Each data chunk may correspond a pixel of the image. Details related to the image contents are further provided, for example, in FIG. 4.

At 304, an operation of the rectangular media frame 304A generation may be executed. The circuitry 202 may be configured to generate the rectangular media frame 304A based on the received set of data streams 302A. Herein, each data stream of the set of data streams 302A associated with the media content 110A may be arranged in a form of line. For example, each contiguous data chunk of a first data stream may be arranged to form a first line. Each contiguous data chunk of a second data stream may be arranged to form a second line. The arrangement of each data stream of the received set of data streams 302A may lead to a generation of the rectangular media frame 304A.

At 306, an operation of first attributes determination may be executed. The circuitry 202 may be configured to determine the set of first attributes 306A associated with each contiguous data chunk for each data stream of the received set of data streams 302A. In an example, the media content 110A may be the audio content. Herein, each data stream of the received set of data streams 302A may correspond to the audio data associated with the first time duration of "10" seconds of the audio content. Further, each data stream associated with the first time duration of "10" seconds may be broken down to the predefined number of contiguous data chunks. Herein, each contiguous data chunk may correspond to the audio data associated with the second time duration of "1" seconds. For each contiguous data chunk, the set of first attributes 306A may be determined. For example, in case of the audio content, the set of first attributes 306A associated with each contiguous data chunk for each data stream may be a pitch, a duration, an intensity, and a timbre associated with the audio data associated with the corresponding contiguous data chunk. That is, the pitch, the duration, the intensity, and the timbre of the audio data associated with the second time duration of "1" second may be determined.

In another example, the media content 110A may be the image content. Each data stream of the set of data streams 302A may correspond to the line of the image content. Each line of the image content may include the predefined number of contiguous data chunks. Each data chunk may correspond to the pixel of the image content. Herein, the set of first attributes 306A associated with a contiguous data chunk may be a first color component, a second color component, and a third color component associated with the corresponding contiguous data chunk. Details related to determination of the set of first attributes 306A for the image content are further, provided for example, in FIG. 4.

At 308, an operation of sub-region selection may be executed. The circuitry 202 may be configured to select the sub-region 308A from the generated rectangular media frame 304A, for the corresponding data stream of the received set of data streams 302A, based on the determined set of first attributes 306A. Herein, for each data stream of the received set of data streams 302A, a sub-region such as, the sub-region 308A may be selected from the generated rectangular media frame 304A. The sub-region 308A may be a portion within the generated rectangular media frame 304A.

In an embodiment, the selection of the sub-region 308A may be based on at least one of an offset from a starting location in the generated rectangular media frame 304A, a length of the sub-region 308A in the generated rectangular media frame 304A, or a width of the sub-region 308A in the generated rectangular media frame 304A. In an example, the starting location may be randomly selected. In another example, the starting location may be a first data chunk in the generated rectangular media frame 304A. Based on the offset from the starting location in the generated rectangular media frame 304A, how far within the generated rectangular media frame is to be traversed to select the sub-region 308A may be determined. The length and the width of the sub-region 308A may be used to determine a size of the sub-region 308A. Thus, based on the size of sub-region 308A, the sub-region 308A may be selected for each data stream.

In an embodiment, the selected sub-region 308A may correspond to a fractal-geometry associated with the generated rectangular media frame 304A. Herein, the selection of a sub-region from the generated rectangular media frame 304A may be iterated a number of times based on a rule to create the fractal-geometry associated with the generated rectangular media frame 304A.

At 310, an operation of fingerprint value determination may be executed. The circuitry 202 may be configured to determine the fingerprint value 310A associated with the corresponding data stream of the received set of data streams 302A, based on the selected sub-region 308A for the corresponding data stream. It may be appreciated that the fingerprint value 310A associated with the corresponding data stream of the received set of data streams 302A may be a unique value associated with the corresponding data stream and may be used to determine an integrity of the media content 110A.

In an embodiment, the circuitry 202 may be further configured to determine a set of second attributes associated with a predefined number of data chunks associated with the selected sub-region, for the corresponding data stream of the received set of data streams 302A. The determination of the fingerprint value for the corresponding data stream may be further based on the determined set of second attributes. In an example, the predefined number of data chunks may be a set of last “8” bytes of the selected sub-region. In an embodiment, the media content 110A may be the audio content. In an example, the predefined number of data chunks may be “8”. The set of second attributes associated with the “8” data chunks may be determined. The predefined number of data chunks may be situated at a specific region in the generated rectangular media frame 304A. In an example, the specific region may correspond to a corner right portion of a last line of the generated rectangular media frame 304A. Herein, the set of second attributes associated with last “8” data chunks of the generated rectangular media frame 304A may be determined. The set of second attributes for the predefined number of data chunks may be the pitch, the duration, the intensity, and the timbre of the audio data associated with the predefined number of data chunks. The set of second attributes may be determined as the fingerprint value 310A. Details related to the determination of the fingerprint value 310A are further provided, for example, in FIG. 4.

At 312, an operation of storing of the determined fingerprint value 310A may be executed. The circuitry 202 may be configured to store the determined fingerprint value 310A on the storage device such as, the database 106 or the memory 204, associated with the electronic device 102.

In an embodiment, the determined fingerprint value 310A may be used to verify whether the media content 110A is unchanged. Herein, a fingerprint value may be first determined for a reference data stream of a set of data streams associated with the reference media content. Thereafter, the fingerprint value determined for the reference media content may be compared with the determined fingerprint value 310A. In case the determined fingerprint value for the reference media content is same as the determined fingerprint value 310A, then the media content 110A may be same as the reference media content. That is, the media content 110A may be unchanged. Thus, the determination of the fingerprint value 310A may be used for determining an integrity of the media content 110A.

The disclosed electronic device 102 may be thus, used to determine the fingerprint value 310A associated with the corresponding data stream of the received set of data streams 302A. The determined fingerprint value 310A may be further used to determine whether the media content 110A may have been altered from an original version of the media content 110A. Further, the disclosed method of generation of the fingerprint value 310A may be repeatable. That is, a same fingerprint value may be determined for the corresponding data stream of the received set of data streams 302A even when a process of determination of the fingerprint value 310A is repeated. In some embodiments, the selected sub-region 308A may correspond to a fractal-geometry associated with the generated rectangular media frame 304A. Thus, the fingerprint value 310A associated with the corresponding data stream of the received set of data streams 302A may be based on the fractal-geometry where even a minute change in the fractal-geometry may have a large impact on the determined fingerprint value 310A. Therefore, an integrity of the media content 110A may be verified even for a minute change in the media content 110A.

Figure 4:
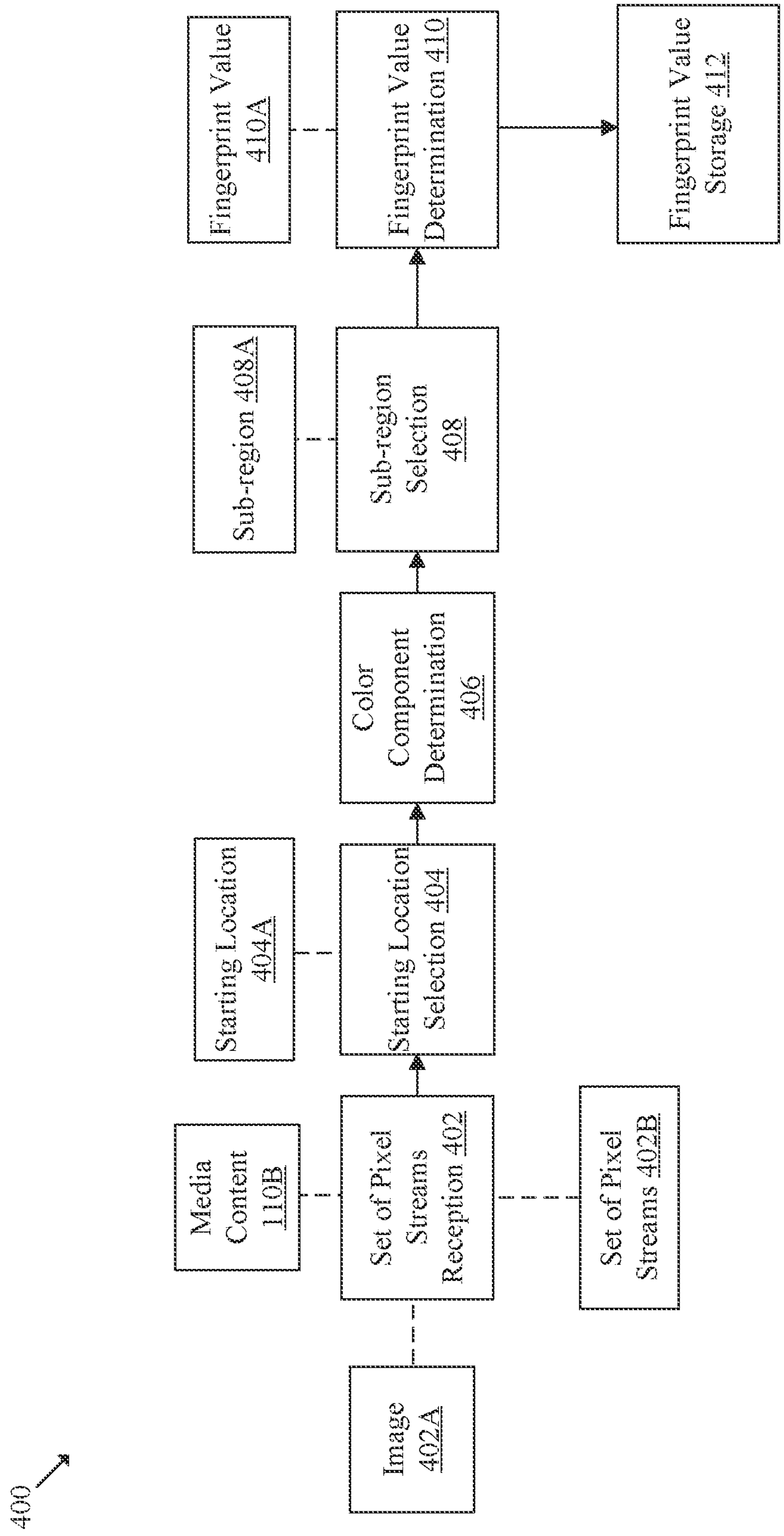
FIG. 4 is a diagram that illustrates an exemplary processing pipeline for fractal-geometry based fingerprint value determination from an image associated with the media content, in accordance with an embodiment of the disclosure.

FIG. 4 is a diagram that illustrates an exemplary processing pipeline for fractal-geometry based fingerprint value determination from an image associated with the media content, in accordance with an embodiment of the disclosure. FIG. 4 is explained in conjunction with elements from FIG. 1, FIG. 2, and FIG. 3. With reference to FIG. 4, there is shown, an exemplary processing pipeline 400 that illustrates exemplary operations from 402 to 412 for fractal-geometry based fingerprint value determination from the image associated with the media content. The exemplary operations 402 to 412 may be executed by any computing system, for example, by the electronic device 102 of FIG. 1 or by the circuitry 202 of FIG. 2. FIG. 4 further includes the media content 110B, an image 402A, a set of pixel streams 402B, a starting location 404A, a sub-region 408A, and a fingerprint value 410A.

At 402, an operation of set of pixel streams reception may be executed. The circuitry 202 may be configured to receive the set of pixel streams 402B associated with the image 402A associated with the media content 110B, wherein each pixel stream of the set of pixel streams 402B may correspond to a predefined number of contiguous pixels of the image 402A. It may be appreciated that the image 402A may be represented in a form of pixels. Herein, the pixels may be arranged in rows and columns to obtain the image 402A. Further, the image 402A may be transmitted in a form of the set of pixel streams 402B. Herein, each pixel stream of the set of pixel streams 402B may correspond to a line or row of pixels of the image 402A. Each pixel stream of the set of pixel streams 402B may include the predefined number of contiguous pixels of the image 402A. In an example, the image 402A may be of size "200×230" pixels. Herein, a number of rows or a number of lines of the image 402A may be "200". That is, the set of pixel streams 402B may include "200" lines. Further, each pixel stream of the set of pixel streams 402B may include "320" pixels. Therefore, the predefined number of contiguous pixels of the image 402A may be "320".

In an embodiment, the media content 110B may be at least one of a pre-recorded video content, a live video content, and an image content. The pre-recorded video content may be a video that may have been recorded in past. It may be appreciated that the pre-recorded video content may include a set of images may be played sequentially during a play-back of the pre-recorded video content. The live video content may be a video that may be received directly form a video camera capturing the live video content. The live video content may include a set of images may be played sequentially during a play-back of the live video content. The image content may be an image that may have been captured by an image capturing device.

At 404, an operation of starting location selection may be executed. The circuitry 202 may be configured to select the starting location 404A within the received image 402A. The starting location may be a region within the received image 402A. In an example, the starting location 404A may be a first pixel, that is, the pixel that lies in a first row and a first column of the received image 402A. In an embodiment, the starting location 404A may be selected randomly.

At 406, an operation of color components determination may be executed. The circuitry 202 may be configured to determine a first color component, a second color component, and a third color component associated with the starting location 404A. The first color component, the second color component, and the third color component may define a color of a pixel of the starting location 404A. In an example, the starting location 404A may be a first pixel within the received image 402A. Herein, the red color component, the green color component, and the blue color component associated with the first pixel may be determined. In such case, the red color component may be the first color component, the green color component may be the second color component, and the blue color component may be the third color component. In another embodiment, the first color component may be a hue, the second color component may be a saturation, and a third color component may be a brightness associated with the starting location 404A.

At 408, an operation of sub-region selection may be executed. The circuitry 202 may be configured to select the sub-region 408A for each pixel stream of the received set of pixel streams based on the determined first color component, the determined second color component, and the determined third color component. Herein, for each pixel stream the first color component, the second color component, and the third color component associated with a pixel next to the starting location 404A may be determined. Based on the determined first color component, the determined second color component, and the determined third color component associated with the pixel next to the starting location 404A, a pixel value may be determined. Thereafter, based on the determined pixel value, whether the pixel next to the starting location 404A corresponds to a last pixel in the corresponding stream may be determined. In case, the pixel next to the starting location 404A does not correspond to the last pixel in the corresponding stream, then the determined pixel value may with compared with a pixel value corresponding to a "black" pixel or a "white" pixel. In case the determined pixel value does not correspond to the "black" pixel or the "white" pixel, then the sub-region 408A may be selected based on the determined first color component, the determined second color component, and the determined third color component associated with the pixel next to the starting location 404A. However, in case the determined pixel value does correspond to the "black" pixel or the "white" pixel, then a pixel other than the next pixel in the corresponding pixel stream may be selected. Details related to the selection of the sub-region are further provided, for example, in FIG. 5.

In an embodiment, the circuitry 202 may be configured to determine a first axis co-ordinate associated with the selected sub-region 408A, based on the determined first color component. In an embodiment, the first axis co-ordinate associated with the selected sub-region 408A may be an "X" axis. In an embodiment, the first axis co-ordinate associated with the selected sub-region 408A may be determined based on the red color component.

In an embodiment, the circuitry 202 may be configured to determine a second axis co-ordinate associated with the selected sub-region 408A, based on the determined second color component, wherein the selection of the sub-region 408A may be further based on the determined the first axis co-ordinate and the determined second axis co-ordinate. In an embodiment, the second axis co-ordinate associated with the selected sub-region 408A may be a "Y" axis. In an embodiment, the second axis co-ordinate associated with the selected sub-region 408A may be determined based on the green color component.

In an embodiment, a size of the selected sub-region 408A may be based on the determined third color component. In an embodiment, the determined third color component may be the blue color component. Herein, based on the blue color component, the size of the selected sub-region 408A may be determined. If the blue color component corresponds to "zero", then the size of the selected sub-region 408A may be based on a new location other than the starting location 404A.

In an embodiment, the selected sub-region 408A may correspond to a fractal-geometry associated with the image 402A. It may be appreciated that to generate the fractal-geometries associated with the image 402A, herein the image 402A may be repeated a number of times based on a pre-defined rule. The fractal-geometries may be generated and the sub-region 408A may be selected based on the generation of the fractal-geometries. Herein, one fractal-geometry may be generated to select the sub-region 408A. It may be appreciated that the fractal-geometries may have an infinite zoom capability, that is, a given fractal-geometry may be zoomed infinitely without having a loss in resolution. Therefore, a usage of the fractal-geometry may allow to loop a process of determination of the finger-print value as many times as needed without loss of image quality.

In an embodiment, a size of the selected sub-region 408A may correspond to an offset of the selected starting location 404A within the image 402A. An offset may indicate a distance of a starting pixel from the selected starting location. Based on the offset of the selected starting location 404A, the size of the selected sub-region 408A within the image 402A may be determined. It should be noted that greater the offset of the selected starting location 404A within the image 402A, smaller may be the size of the selected sub-region 408A.

At 410, an operation of fingerprint value determination may be executed. The circuitry 202 may be configured to determine the fingerprint value 410A associated with the corresponding pixel stream of the received set of pixel streams 402B, based on the selected sub-region 408A for the corresponding pixel stream. The fingerprint value 310A associated with the corresponding pixel stream of the received set of pixel streams 402B may be a unique value associated with the corresponding pixel stream and may be used to determine an integrity of the media content 110B.

In an embodiment, the circuitry 202 may be configured to determine a set of color components associated with each pixel of a predefined number of pixels in the selected sub-region 408A, for the corresponding pixel stream of the received set of pixel streams 402B. The determination of the fingerprint value 410A for the corresponding pixel stream may be further based on the determined set of color components associated with the predefined number of pixels in the selected sub-region 408A. The predefined number of pixels may be selected from a specific region in the selected sub-region 408A. The specific region may correspond to a corner right portion of a last pixel stream of the selected sub-region 408A. In another example, the specific region may correspond to a corner left portion of a last pixel stream of the selected sub-region 408A. In another example, the specific region may correspond to a corner right portion of a last pixel stream of the selected sub-region 408A. In another example, the specific region may correspond to a corner left portion of a first pixel stream of the selected sub-region 408A. In yet another example, the specific region may correspond to a corner right portion of a first pixel stream of the selected sub-region 408A.

In an example, the predefined number of pixels may be "8". Further, the predefined number of pixels may be present in the corner right portion of the last pixel stream of the selected sub-region 408A. Herein, the circuitry 202 may be configured to determine the set of color components such as, the red color component, the green color component, and the blue color component of each pixel of last "8" pixels of the last row of the selected sub-region 408A. Further, the fingerprint value 410A for the corresponding pixel stream may be determined based on the determined set of color components for each pixel of last "8" pixels of the last row of the selected sub-region 408A.

It may be appreciated that in a high-definition (HD) video content, typically a pixel stream may include "1920" pixels and each pixel may be represented by three color components. In such cases too, the fingerprint value pixel stream of the image associated with the HD video content may be represented by eight bytes. Thus, a compression factor of "720" to "1" may be achieved. Further for a "4K" video content, typically a pixel stream may include "3820" pixels and each pixel may be represented by three color components. The fingerprint value for each pixel stream of the image associated with the video content may still be of eight bytes. Thus, a compression factor of "1,440" to "1" for the 4K video content may be achieved.

At 412, an operation of fingerprint value storing may be executed. The circuitry 202 may be configured to store the determined fingerprint value 410A on the storage device, such as, the database 106 or the memory 204, associated with the electronic device 102.

In an embodiment, the determined fingerprint value 410A may be used to verify whether an image (e.g., the image 402A) is unchanged. Herein, the fingerprint value may be determined for a pixel stream of a set of pixel streams associated with a reference image. Thereafter, the determined fingerprint value for the reference image may be compared with the determined fingerprint value 410A. In case the determined fingerprint value for the reference image is same as the determined fingerprint value 410A, then media content 110B may be same as the reference image. That is, the media content 110B may be unchanged. Thus, the determination of the fingerprint value 410A may be used for determination of an integrity of the media content 110B.

Thus, the disclosed electronic device 102 may be used to determine the fingerprint value 410A associated with the corresponding pixel stream of the received set of pixel streams 402B associated with the video content. The determined fingerprint value 410A may be further used to determine whether the media content 110B may have been altered from the original version of the media content 110B. Further, the disclosed method of generation of the fingerprint value 410A may be repeatable. That is, a same fingerprint value may be determined for the corresponding pixel stream of the received set of pixel streams even when a process of determination of the fingerprint value 410A is repeated. In some embodiments, the selected sub-region 408A may correspond to the fractal-geometry. Thus, the fingerprint value 410A associated with the corresponding pixel stream of the received set of pixel streams 402B may be based on the fractal-geometry, where even a minute change in shape of the fractal-geometry may have a large impact on the determined fingerprint value 410A. Therefore, an integrity of the media content 110B may be verified even for a minute change in the media content 110B. Further, a size of the determined fingerprint may remain same irrespective of a size of the media content 110B. Therefore, a memory space required to store the media content 110B may be minimal.

Figure 5:
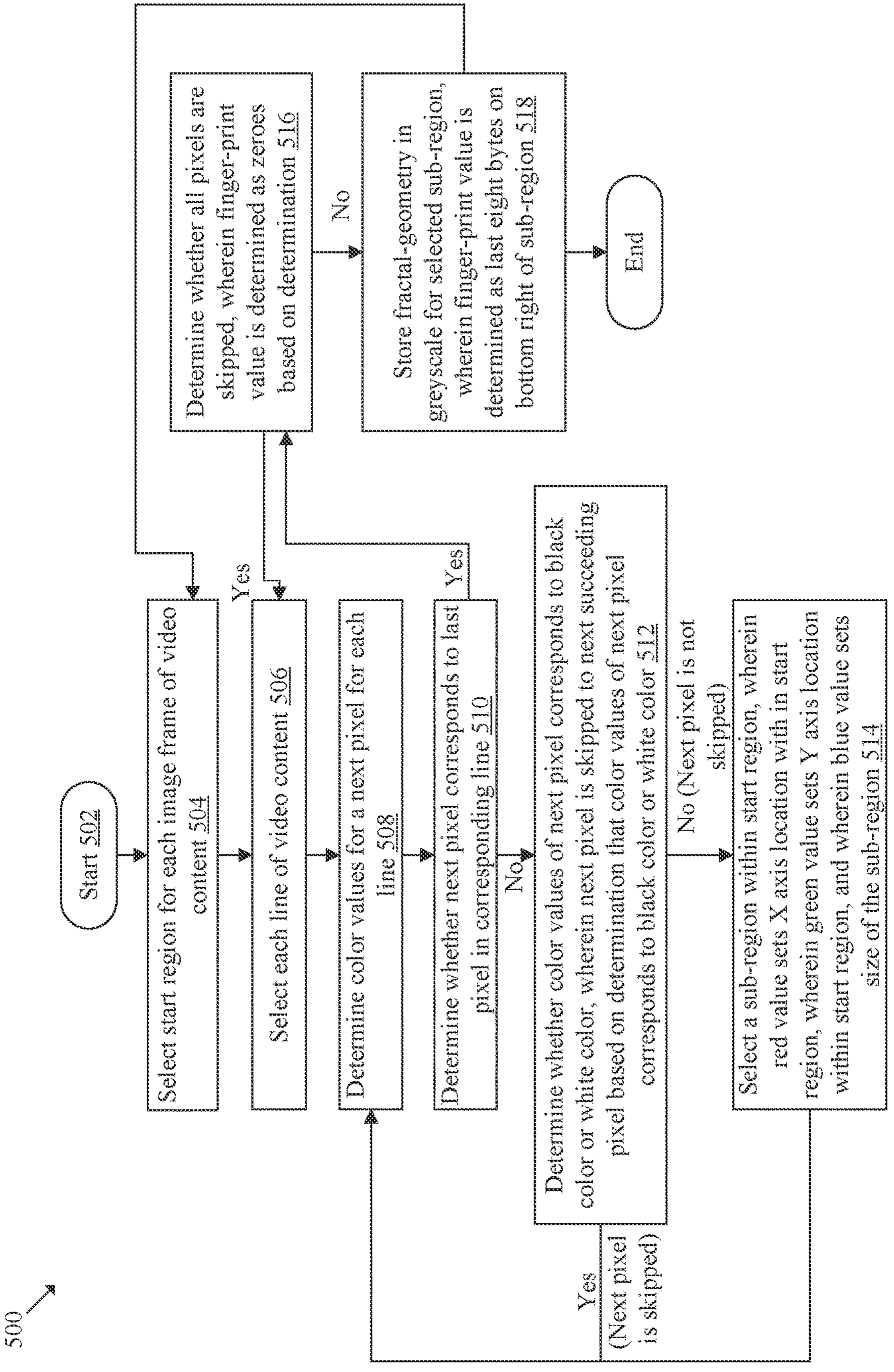
FIG. 5 is a flowchart that illustrates operations of an exemplary method for fractal-geometry based fingerprint value determination from an image associated with a video content, in accordance with an embodiment of the disclosure.

FIG. 5 is a flowchart that illustrates operations of an exemplary method for fractal-geometry based fingerprint value determination from an image associated with a video content, in accordance with an embodiment of the disclosure. FIG. 5 is described in conjunction with elements from FIG. 1, FIG. 2, FIG. 3, and FIG. 4. With reference to FIG. 5, there is shown a flowchart 500. The flowchart 500 may include operations from 502 to 518 and may be implemented by the electronic device 102 of FIG. 1 or by the circuitry 202 of FIG. 2. The flowchart 500 may start at 502 and proceed to 504.

At 502, a start region for each image frame of the video content may be selected. The circuitry 202 may be configured to select the start region for each image frame of the video content. It may be appreciated that the video content may include a plurality of image frames. Each image frame of the plurality of the image frames may be played sequentially within a time frame during a play-back of the video content. The circuitry 202 may be configured to select the start region for each image frame of the set of image frames associated with the video content. In an example, the start region for each image frame may be a pixel associated with a first row and a first column of the corresponding image frame. In an example, the start region for each image frame may be randomly selected. Details related to the selection of the start region are further described, for example, in FIG. 4 (at 402).

At 506, each line of the video content may be selected. The circuitry 202 may be configured to select each line of the video content. As discussed, the video content may include the plurality of image frames. It may be appreciated that each image frame may include a set of pixels that may be arranged in a set of rows and a set of columns. In an example, each row of the set of rows may be defined as a line. Thus, the circuitry 202 may be configured to select each line of the video content.

At 508, color values for a next pixel for each line may be determined. The circuitry 202 may be configured to determine the color values for the next pixel for each line. Herein, the color values may correspond to a first color component, a second color component, and a third color component associated with the next pixel for the corresponding line. In an example, the first color component may correspond to the red color component, the second color component may correspond to the green color component, and the third color component may correspond to the blue color component.

At 510, whether the next pixel corresponds to last pixel in the corresponding line may be determined. The circuitry 202 may be configured to determine whether the next pixel corresponds to the last pixel in corresponding line. The last pixel may be an end pixel in the corresponding line. In case the next pixel does not correspond to the last pixel in corresponding line, then control may pass to the step 512. In case the next pixel does correspond to the last pixel in corresponding line, then control may pass to the step 516.

At 512, whether the color values of the next pixel correspond to a black color, or a white color may be determined. The circuitry 202 may be configured to determine whether the color values of the next pixel correspond to the black color or the white color, wherein the next pixel may be skipped to a next succeeding pixel based on the determination that the color values of the next pixel correspond to the black or the white colors. It may be appreciated that a pixel may be represented in a byte format. Herein, a pixel value may be stored as "8" bit integers. For example, each color component of the pixel may be represented in a range from 0 to 255. Typically, when each color component of a given pixel correspond to zero then the color of the corresponding pixel is black color. Similarly, when each color component of a given pixel correspond to one then the color of the corresponding pixel is the white color. Thus, the white color and the black color may be extreme end of the range from 0 to 255. Therefore, in case the color values of the next pixel correspond to the black color or the white color, then the next pixel may be skipped to the next succeeding pixel and control may pass to the step 508. However, in case the color values of the next pixel do not correspond to the black color or the white color then control may pass to the step 514.

At 514, the sub-region may be selected within the start region. The circuitry 202 may be configured to select the sub-region within the start region. In an embodiment, the red value may set the "X axis" location within the start region, the green value may set the "Y" axis location within the start region, and the blue value may set the size of the sub-region. However, in case the blue value is "zero", then the size may be set to fill the sub-region from a new location. Upon selection of the sub-region control may pass to the step 508.

As discussed, in case the next pixel does correspond to the last pixel in corresponding line, then control may pass to the step 516. At 516, whether all pixels of the corresponding line are skipped may be determined. The circuitry 202 may be configured to determine whether all pixels of the corresponding line are skipped. In an embodiment, the finger-print value may be determined as all zeroes (e.g., 8 bytes of "0's") based on the determination that all the pixels are skipped. It will be appreciated that all the pixels of a line may be skipped in case all the pixel values are either black or white. In an example, in case all pixels of the corresponding line are skipped, then the finger-print value is determined as zero such as "00000000". However, in case all pixels of the corresponding line are not skipped then control may pass to the step 518.

At 518, the fractal-geometry associated with the selected sub-region may be stored in a greyscale and the finger-print value may be determined as the last eight bytes on the bottom right of the selected sub-region. The circuitry 202 may be configured to store the fractal-geometry associated with the selected sub-region may be stored in greyscale. The circuitry 202 may be further configured to determine finger-print value as the last eight bytes on the bottom right of the selected sub-region based on the stored fractal-geometry. Details related to the determination of the finger-print value are further provided for example, in FIG. 4 (at 412). Control may pass to end.

Although the flowchart 500 is illustrated as discrete operations, such as, 504, 506, 508, 510, 512, 514, 516, and 518 the disclosure is not so limited. Accordingly, in certain embodiments, such discrete operations may be further divided into additional operations, combined into fewer operations, or eliminated, depending on the implementation without detracting from the essence of the disclosed embodiments.

Figure 6:
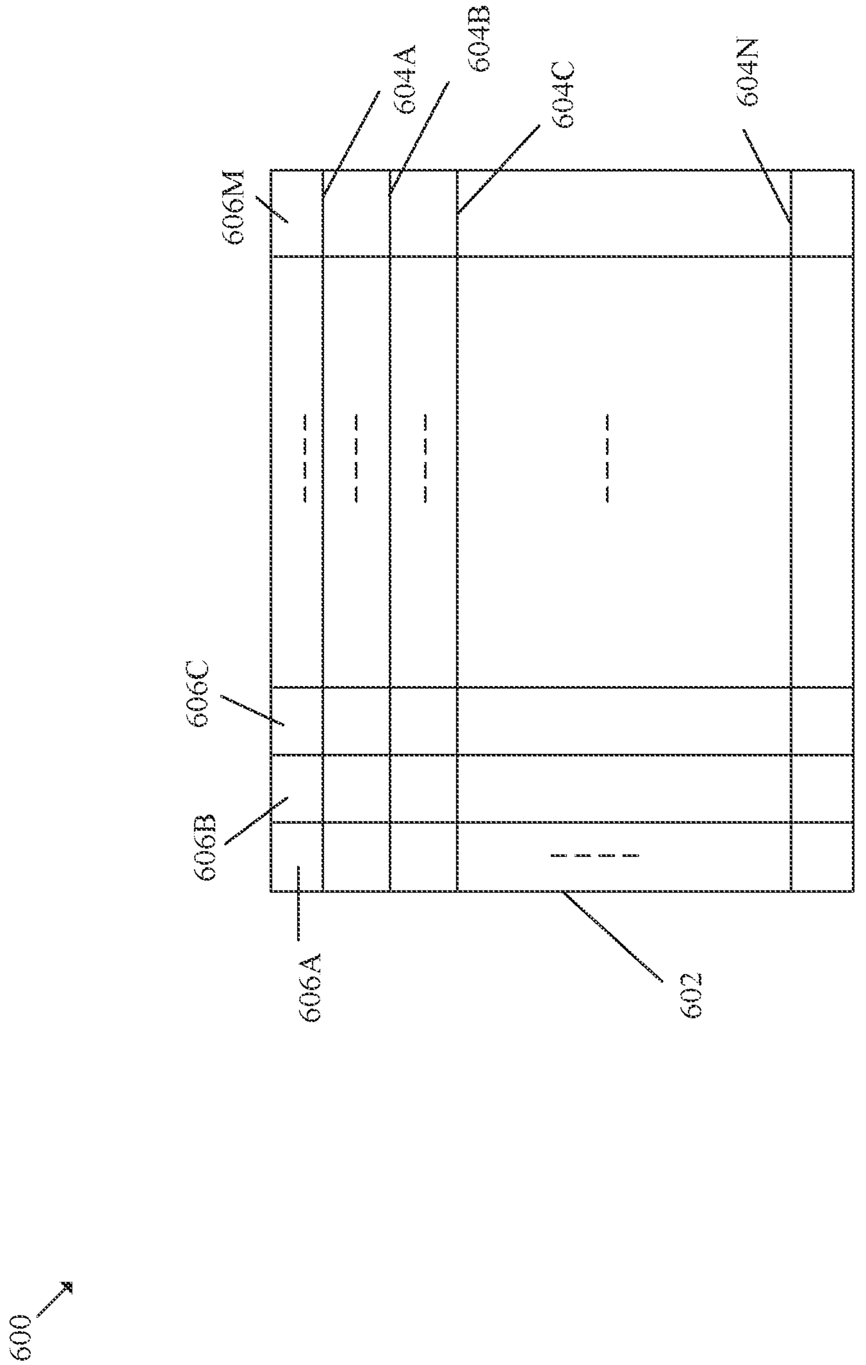
FIG. 6 is a diagram that illustrates an exemplary scenario of a rectangular media frame, in accordance with an embodiment of the disclosure.

FIG. 6 is a diagram that illustrates an exemplary scenario of a rectangular media frame, in accordance with an embodiment of the disclosure. FIG. 6 is described in conjunction with elements from FIG. 1, FIG. 2, FIG. 3, FIG. 4, and FIG. 5. With reference to FIG. 6, there is shown an exemplary scenario 600. The scenario 600 may include a rectangular media frame 602. The rectangular media frame 602 includes a set of data streams comprising a data stream 604A, a data stream 604B, a data stream 604C . . . a data stream 604N. Each data stream of the received set of data streams corresponds to an "M" number of contiguous data chunks. The data stream 604A includes a contiguous data chunk 606A, a contiguous data chunk 606B, a contiguous data chunk 606C . . . , a contiguous data chunk 606M.

Although FIG. 6 shows that the received set of data streams includes N data streams, the scope of the disclosure may not be so limited. The received set of data streams may include only two data streams or more than N data streams without departure from the scope of the disclosure.

Further, although FIG. 6 shows that each data stream of the received set of data streams corresponds to M number of contiguous data chunks, the scope of the disclosure may not be so limited. Each data stream may correspond to only two contiguous data chunks or more than M contiguous data chunks without departure from the scope of the disclosure. A set of operations associated the with scenario 600 is described herein.

With reference to FIG. 6, the circuitry 202 may receive the set of data streams comprising the data stream 604A, the data stream 604B, the data stream 604C . . . , the data stream 604N associated with the media content 110A. Herein, each data stream of the received set of data streams may correspond to the predefined number of contiguous data chunks of the media content 110A. With reference to FIG. 6, the predefined number of contiguous data chunks may be "M". For example, the data stream 604A may include the "M" number of contiguous data chunks of the media content 110A such as, the contiguous data chunk 606A, the contiguous data chunk 606B, the contiguous data chunk 606C, up to the contiguous data chunk 606M.

Further, with reference to FIG. 6, each data stream of the received set of data streams such as, the data stream 604A, the data stream 604B, the data stream 604C . . . , the data stream 604N associated with the media content 110A may be arranged in a line associated with the corresponding data stream in order to generate the rectangular media frame 602.

It should be noted that scenario 600 of FIG. 6 is for exemplary purposes and should not be construed to limit the scope of the disclosure.

Figure 7:
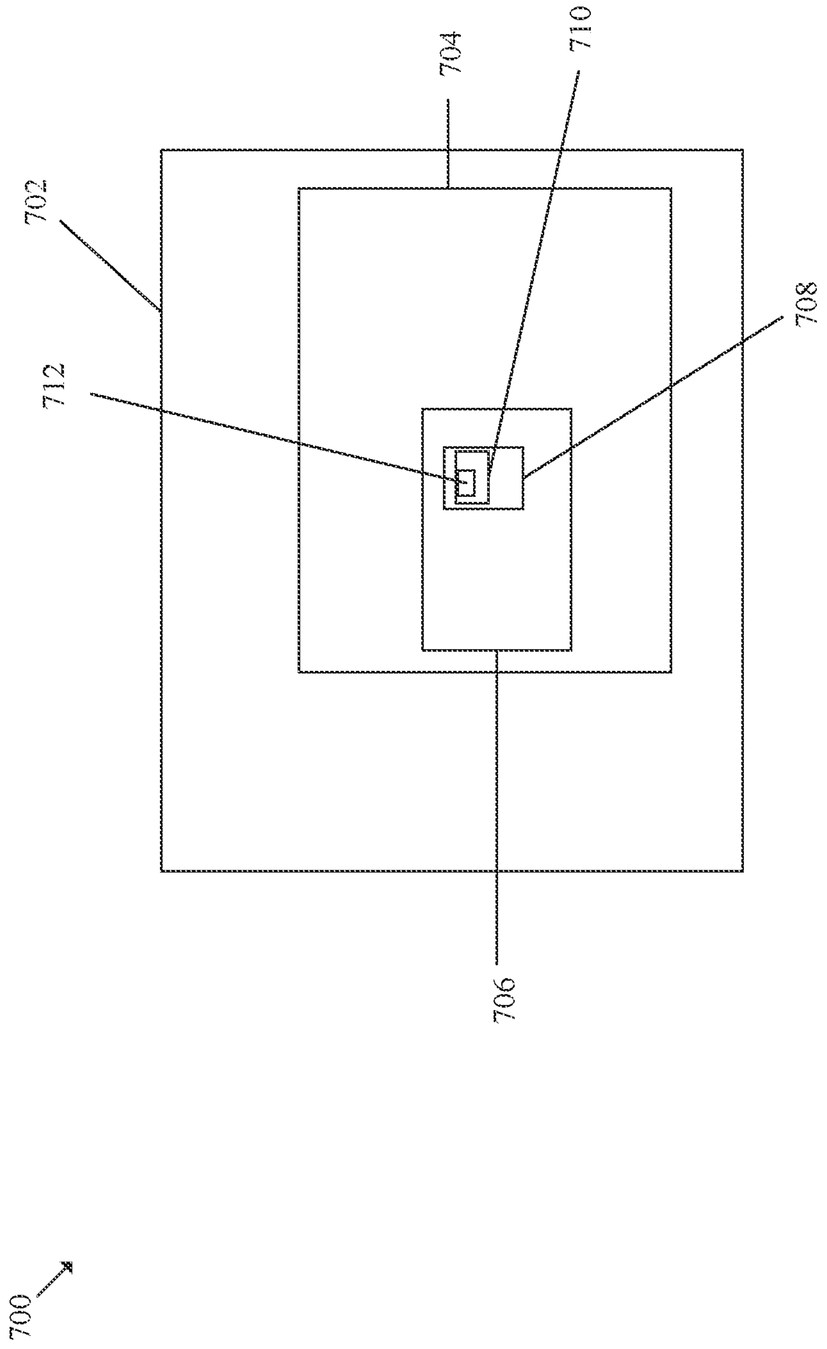
FIG. 7 is a diagram that illustrates an exemplary scenario for selection of the sub-region, in accordance with an embodiment of the disclosure.

FIG. 7 is a diagram that illustrates an exemplary scenario for selection of the sub-region, in accordance with an embodiment of the disclosure. FIG. 7 is described in conjunction with elements from FIG. 1, FIG. 2, FIG. 3, FIG. 4, FIG. 5, and FIG. 6. With reference to FIG. 7, there is shown an exemplary scenario 700. The scenario 700 may include a start region 702, a sub-region 704, a sub-region 706, a sub-region 708, and a sub-region 710. A set of operations associated the with scenario 700 is described herein.

With reference to FIG. 7, the start region 702 may be associated with a given image frame of a video content. In an example, the start region 702 may be selected randomly from the given image frame. The first color component, the second color component, and the third color component associated with the start region 702 may be determined. Thereafter, the sub-region 704 may be selected based on the determined first color component, the determined second color component, and the determined third color component.

The first color component, the second color component, and the third color component associated with the sub-region 704 may be determined. Thereafter, the sub-region 706 may be selected based on the determined first color component, the determined second color component, and the determined third color component associated with the sub-region 704. Similarly, the first color component, the second color component, and the third color component associated with the sub-region 706 may be determined. Thereafter, the sub-region 708 may be selected within the sub-region 706 based on the determined first color component, the determined second color component, and the determined third color component associated with the sub-region 706. Similarly, the first color component, the second color component, and the third color component associated with the sub-region 708 may be determined. Thereafter, the sub-region 710 may be selected within the sub-region 708 based on the determined first color component, the determined second color component, and the determined third color component associated with the sub-region 710. This process may be continued until all data streams of the media content are processed. As the sub-regions correspond to fractal-geometries, there may be no loss of quality associated with the media content and the process of the determination of the fingerprint may be repeatable such that a same value of the fingerprint may be generated in case the media content is unchanged.

It should be noted that scenario 700 of FIG. 7 is for exemplary purposes and should not be construed to limit the scope of the disclosure.

Figure 8:
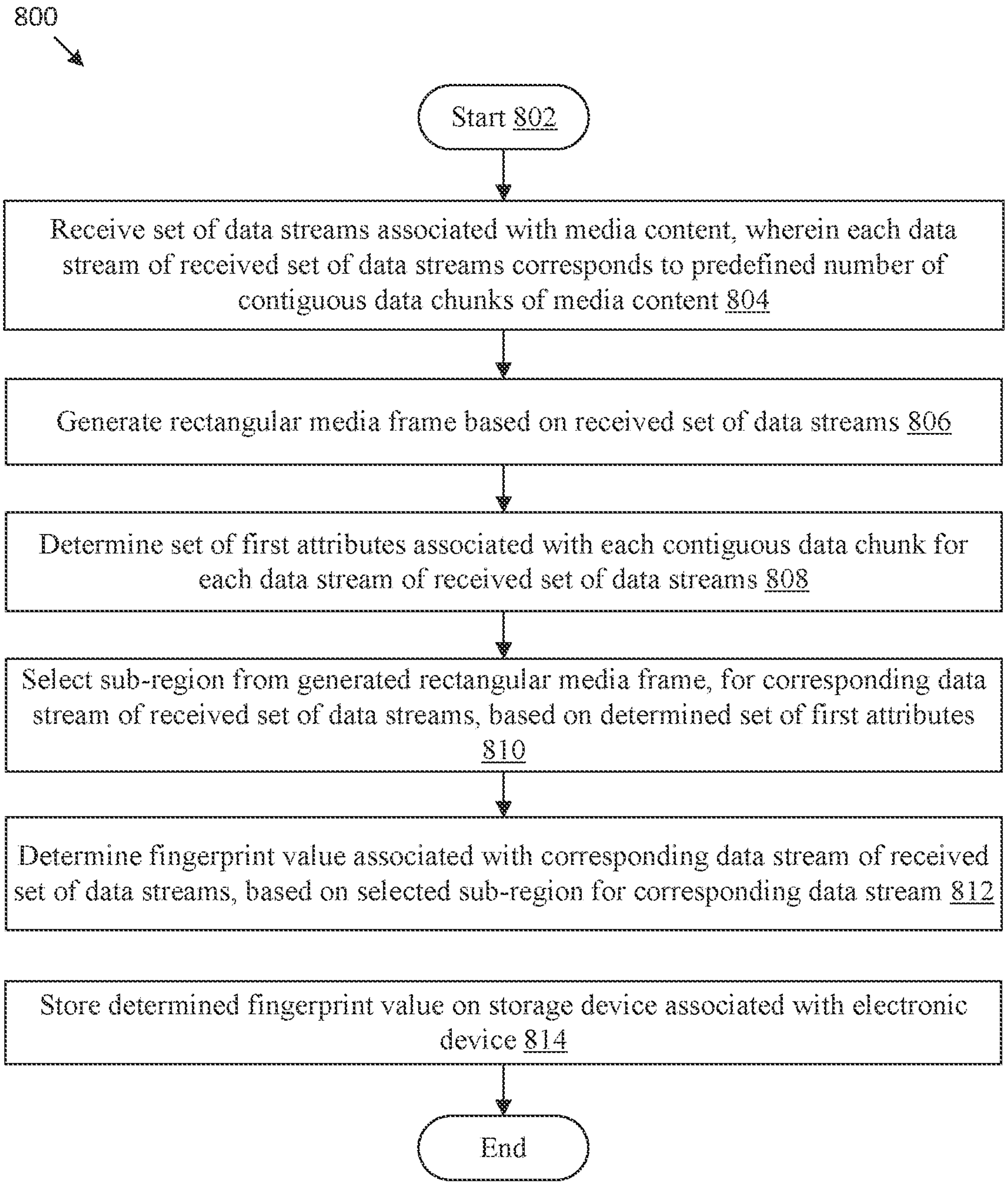
FIG. 8 is a flowchart that illustrates operations of an exemplary method for fractal-geometry based fingerprint value determination from media content, in accordance with an embodiment of the disclosure.

FIG. 8 is a flowchart that illustrates operations of an exemplary method for fractal-geometry based fingerprint value determination from media content, in accordance with an embodiment of the disclosure. FIG. 8 is described in conjunction with elements from FIG. 1, FIG. 2, FIG. 3, FIG. 4, FIG. 5, FIG. 6, and FIG. 7. With reference to FIG. 8, there is shown a flowchart 800. The flowchart 800 may include operations from 802 to 814 and may be implemented by the electronic device 102 of FIG. 1 or by the circuitry 202 of FIG. 2. The flowchart 800 may start at 802 and proceed to 804.

At 804, the set of data streams 302A associated with the media content 110A may be received, wherein each data stream of the received set of data streams 302A may correspond to the predefined number of contiguous data chunks of the media content 110A. The circuitry 202 may be configured to receive the set of data streams 302A associated with the media content 110A, wherein each data stream of the received set of data streams 302A may correspond to the predefined number of contiguous data chunks of the media content 110A. Details related to the reception of the set of data streams 302A are further provided, for example, in FIG. 3 (at 302).

At 806, the rectangular media frame 304A may be generated based on the received set of data streams 302A. The circuitry 202 may be configured to generate the rectangular media frame 304A based on the received set of data streams 302A. Details related to the generation of the rectangular media frame 304A are further provided, for example, in FIG. 3 (at 304).

At 808, the set of first attributes 306A associated with each contiguous data chunk for each data stream of the received set of data streams 302A may be determined. The circuitry 202 may be configured to determine the set of first attributes 306A associated with each contiguous data chunk for each data stream of the received set of data streams 302A. Details related to the determination of the set of first attributes 306A are further provided, for example, in FIG. 3 (at 306).

At 810, the sub-region 308A may be selected from the generated rectangular media frame 304A, for the corresponding data stream of the received set of data streams 302A, based on the determined set of first attributes 306A. The circuitry 202 may be configured to select the sub-region 308A from the generated rectangular media frame 304A, for the corresponding data stream of the received set of data streams 302A, based on the determined set of first attributes 306A. Details related to the selection of the sub-region 308A are further provided, for example, in FIG. 3 (at 308).

At 812, the fingerprint value 310A associated with the corresponding data stream of the received set of data streams 302A may be determined, based on the selected sub-region 308A for the corresponding data stream. The circuitry 202 may be configured to determine the fingerprint value 310A associated with the corresponding data stream of the received set of data streams 302A, based on the selected sub-region 308A for the corresponding data stream. Details related to the determination of the fingerprint value 310A are further provided, for example, in FIG. 3 (at 310).

At 814, the determined fingerprint value 310A may be stored on the storage device associated with the electronic device 102. The circuitry 202 may be configured to store the determined fingerprint value 310A on the storage device associated with the electronic device 102. Details related to the storing of the determined fingerprint value 310A are further provided, for example, in FIG. 3 (at 312). Control may pass to end.

Although the flowchart 800 is illustrated as discrete operations, such as, 804, 806, 808, 810, 812, and 814, the disclosure is not so limited. Accordingly, in certain embodiments, such discrete operations may be further divided into additional operations, combined into fewer operations, or eliminated, depending on the implementation without detracting from the essence of the disclosed embodiments.

Figure 9:
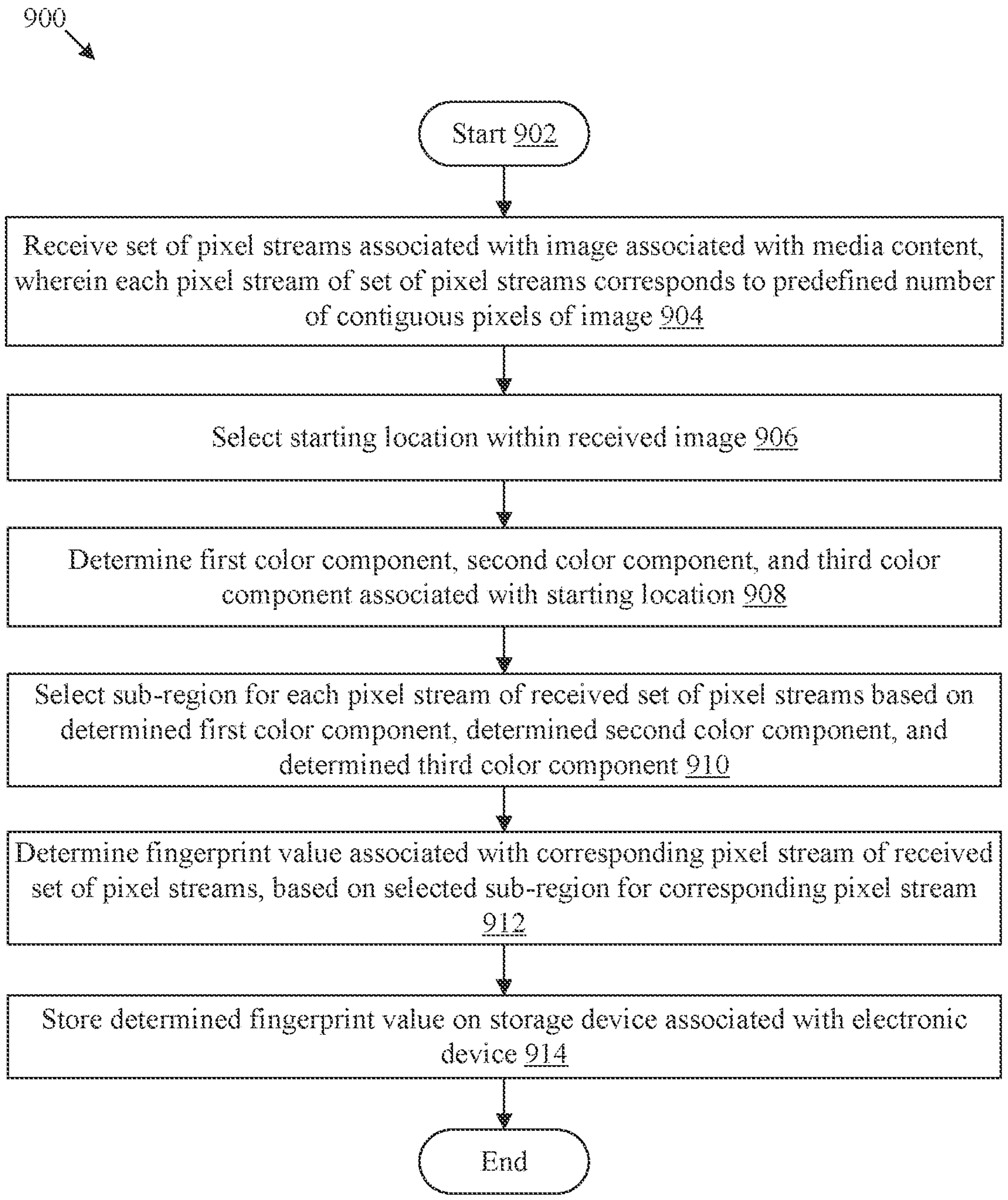
FIG. 9 is a flowchart that illustrates operations of an exemplary method for fractal-geometry based fingerprint value determination from an image associated with the media content, in accordance with an embodiment of the disclosure.

FIG. 9 is a flowchart that illustrates operations of an exemplary method for fractal-geometry based fingerprint value determination from an image associated with the media content, in accordance with an embodiment of the disclosure. FIG. 9 is described in conjunction with elements from FIG. 1, FIG. 2, FIG. 3, FIG. 4, FIG. 5, FIG. 6, FIG. 7, and FIG. 8. With reference to FIG. 9, there is shown a flowchart 900. The flowchart 900 may include operations from 902 to 914 and may be implemented by the electronic device 102 of FIG. 1 or by the circuitry 202 of FIG. 2. The flowchart 900 may start at 902 and proceed to 904.

At 904, the set of pixel streams 402B associated with the image 402A associated with the media content 110B may be received, wherein each pixel stream of the set of pixel streams 402B may correspond to the predefined number of contiguous pixels of the image 402A. The circuitry 202 may be configured to receive the set of pixel streams 402B associated with the image 402A associated with the media content 110B, wherein each pixel stream of the set of pixel streams 402B may correspond to the predefined number of contiguous pixels of the image 402A. Details related to the reception of the set of pixel streams 402B are further provided, for example, in FIG. 4 (at 402).

At 906, the starting location 404A within the received image 402A may be selected. The circuitry 202 may be configured to select the starting location 404A within the received image 402A. Details related to the selection of the starting location 404A are further provided, for example, in FIG. 4 (at 404).

At 908, the first color component, the second color component, and the third color component associated with the starting location 404A may be determined. The circuitry 202 may be configured to determine the first color component, the second color component, and the third color component associated with the starting location 404A Details related to the determination of the first color component, the second color component, and the third color component are further provided, for example, in FIG. 4 (at 406).

At 910, the sub-region 408A may be selected for each pixel stream of the received set of pixel streams 402B based on the determined first color component, the determined second color component, and the determined third color component. The circuitry 202 may be configured to select the sub-region 408A for each pixel stream of the received set of pixel streams 402B based on the determined first color component, the determined second color component, and the determined third color component. Details related to the selection of the sub-region 408A are further provided, for example, in FIG. 4 (at 408).

At 912, the fingerprint value 410A associated with the corresponding pixel stream of the received set of pixel streams 402B may be determined, based on the selected sub-region 408A for the corresponding pixel stream. The circuitry 202 may be configured to determine the fingerprint value 410A associated with the corresponding pixel stream of the received set of pixel streams 402B, based on the selected sub-region 408A for the corresponding pixel stream. Details related to the determination of the fingerprint value 410A are further provided, for example, in FIG. 4 (at 410).

At 914, the determined fingerprint value 410A may be stored on the storage device associated with the electronic device 102. The circuitry 202 may be configured to store the determined fingerprint value 410A on the storage device associated with the electronic device 102. Details related to the storing of the determined fingerprint value 410A are further provided, for example, in FIG. 4 (at 412). Control may pass to end.

Although the flowchart 900 is illustrated as discrete operations, such as, 904, 906, 908, 910, 912, and 914, the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (for example, the electronic device 102 of FIG. 1). Such instructions may cause the electronic device 102 to perform operations that may include reception of a set of data streams (e.g., the set of data streams 302A) associated with a media content (e.g., the media content 110A), wherein each data stream of the received set of data streams 302A may correspond to a predefined number of contiguous data chunks of the media content 110A. The operations may further include generation of a rectangular media frame (e.g., the rectangular media frame 304A) based on the received set of data streams 302A. The operations may further include determination of a set of first attributes (e.g., the set of first attributes 306A) associated with each contiguous data chunk for each data stream of the received set of data streams 302A. The operations may further include selection of a sub-region (e.g., the sub-region 308A) from the generated rectangular media frame 304A, for the corresponding data stream of the received set of data streams 302A, based on the determined set of first attributes 306A. The operations may further include determination of a fingerprint value (e.g., the fingerprint value 310A) associated with the corresponding data stream of the received set of data streams 302A, based on the selected sub-region 308A for the corresponding data stream. The operations may further include storing the determined fingerprint value 310A on a storage device (e.g., the database 106) associated with the electronic device 102.

Various embodiments of the disclosure may provide a non-transitory computer-readable medium and/or storage medium having stored thereon, computer-executable instructions executable by a machine and/or a computer to operate an electronic device (for example, the electronic device 102 of FIG. 1). Such instructions may cause the electronic device 102 to perform operations that may include reception of a set of pixel streams (e.g., the set of pixel streams 402B) associated with an image (e.g., the image 402A) associated with the media content 110B, wherein each pixel stream of a set of pixel streams (e.g., the set of pixel streams 402B) may correspond to a predefined number of contiguous pixels of the image 402A. The operations may further include selection of a starting location 404A (e.g., starting location 404A) within the received image 402A. The operations may further include determination of the first color component, the second color component, and the third color component associated with the starting location 404A. The operations may further include selection of a sub-region (e.g., the sub-region 408A) for each pixel stream of the received set of pixel streams 402B based on the determined first color component, the determined second color component, and the determined third color component. The operations may further include determination of a fingerprint value (e.g., the fingerprint value 410A) associated with the corresponding pixel stream of the received set of pixel streams 402B, based on the selected sub-region 408A for the corresponding pixel stream. The operations may further include storing the determined fingerprint value 410A on a storage device (e.g., the database 106) associated with the electronic device 102.

Exemplary aspects of the disclosure may provide an electronic device (such as, the electronic device 102 of FIG. 1) that includes circuitry (such as, the circuitry 202). The circuitry 202 may be configured to receive the set of data streams 302A associated with the media content 110A, wherein each data stream of the received set of data streams 302A may correspond to the predefined number of contiguous data chunks of the media content 110A. The circuitry 202 may be configured to generate the rectangular media frame 304A based on the received set of data streams 302A. The circuitry 202 may be configured to determine the set of first attributes 306A associated with each contiguous data chunk for each data stream of the received set of data streams 302A. The circuitry 202 may be configured to select the sub-region 308A from the generated rectangular media frame 304A, for the corresponding data stream of the received set of data streams 302A, based on the determined set of first attributes 306A. The circuitry 202 may be configured to determine the fingerprint value 310A associated with the corresponding data stream of the received set of data streams 302A, based on the selected sub-region 308A for the corresponding data stream. The circuitry 202 may be configured to store the determined fingerprint value 310A on the storage device (such as, the database 106) associated with the electronic device 102.

Exemplary aspects of the disclosure may provide an electronic device (such as, the electronic device 102 of FIG. 1) that includes circuitry (such as, the circuitry 202). The circuitry 202 may be configured to receive the set of pixel streams 402B associated with the image 402A associated with the media content 110B, wherein each pixel stream of the set of pixel streams 402B may corresponds to the predefined number of contiguous pixels of the image 402A. The circuitry 202 may be configured to select the starting location 404A within the received image 402A. The circuitry 202 may be configured to determine the first color component, the second color component, and the third color component associated with the starting location 404A. The circuitry 202 may be configured to select the sub-region 408A for each pixel stream of the received set of pixel streams 402B based on the determined first color component, the determined second color component, and the determined third color component. The circuitry 202 may be configured to determine the fingerprint value 410A associated with the corresponding pixel stream of the received set of pixel streams 402B, based on the selected sub-region 408A for the corresponding pixel stream. The circuitry 202 may be configured to store the determined fingerprint value 410A on the storage device associated with the electronic device 102.

In an embodiment, the selection of the sub-region 308A may be based on at least one of the offset from the starting location in the generated rectangular media frame 304A, the length of the sub-region 308A in the generated rectangular media frame 304A, or the width of the sub-region 308A in the generated rectangular media frame 304A.

In an embodiment, the media content 110A may include at least one of the audio content, the video content, the image content, and the textual content.

In an embodiment, the circuitry 202 may be further configured to determine the set of second attributes associated with the predefined number of data chunks associated with the selected sub-region 308A, for the corresponding data stream of the received set of data streams 302A, wherein the determination of the fingerprint value 310A for the corresponding data stream may be further based on the determined set of second attributes.

In an embodiment, the determined fingerprint value 310A may be used to verify whether the media content 110A may be unchanged.

In an embodiment, the selected sub-region 308A may corresponds to the fractal-geometry associated with the generated rectangular media frame 304A.

In an embodiment, the circuitry 202 may be further configured to determine the first axis co-ordinate associated with the selected sub-region 408A, based on the determined first color component. The circuitry 202 may be further configured to determine the second axis co-ordinate associated with the selected sub-region 408A, based on the determined second color component, wherein the selection of the sub-region 408A may be further based on the determined the first axis co-ordinate and the determined second axis co-ordinate.

In an embodiment, the size of the selected sub-region 408A may be based on the determined third color component.

In an embodiment, the size of the selected sub-region 408A may correspond to the offset of the selected starting location within the image 402A.

In an embodiment, the circuitry 202 may be further configured to determine the set of color components associated with each pixel of the predefined number of pixels in the selected sub-region 408A, for the corresponding pixel stream of the received set of pixel streams 402B, wherein the determination of the fingerprint value 410A for the corresponding pixel stream may be further based on the determined set of color components associated with the predefined number of pixels in the selected sub-region 408A.

In an embodiment, the media content 110B may be at least one of the pre-recorded video content, the live video content, and the image content.

In an embodiment, the determined fingerprint value may be used to verify whether the image 402A is unchanged.

In an embodiment, the selected sub-region 408A may correspond to the fractal-geometry associated with the image 402A.

The present disclosure may also be positioned in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. An electronic device, comprising:

circuitry configured to:

receive a set of data streams associated with media content, wherein each data stream of the received set of data streams corresponds to a specific number of a plurality of contiguous data chunks of the media content;

generate a rectangular media frame based on the received set of data streams;

determine a set of first attributes associated with each contiguous data chunk of the plurality of contiguous data chunks for each data stream of the received set of data streams;

select, based on the determined set of first attributes, a sub-region from the generated rectangular media frame for a respective data stream of the received set of data streams, wherein the selection of the sub-region is repeated a specific number of times based on a specific rule to create a fractal-geometry associated with the generated rectangular media frame, and the selected sub-region corresponds to the fractal-geometry associated with the generated rectangular media frame;

determine, based on the selected sub-region, a fingerprint value associated with the respective data stream of the received set of data streams; and store the determined fingerprint value on a storage device associated with the electronic device.

2. The electronic device according to claim 1, wherein the circuitry is further configured to select the sub-region based on at least one of:

an offset from a start location in the generated rectangular media frame, a length of the sub-region in the generated rectangular media frame, or a width of the sub-region in the generated rectangular media frame.

3. The electronic device according to claim 1, wherein the media content includes at least one of audio content, video content, image content, or textual content.

4. The electronic device according to claim 1, wherein the circuitry is further configured to:

determine a set of second attributes associated with a specific number of a plurality of data chunks for the respective data stream of the received set of data streams, wherein the specific number of the plurality of data chunks is associated with the selected sub-region; and determine the fingerprint value for the respective data stream based on the determined set of second attributes.

5. The electronic device according to claim 1, wherein the media content is verifiable based on the stored fingerprint value.

6. An electronic device, comprising:

circuitry configured to:

receive a set of pixel streams associated with an image, wherein the image is associated with media content, and each pixel stream of the set of pixel streams corresponds to a specific number of a plurality of contiguous pixels of the image;

select a start location within the image;

determine each of a first color component, a second color component, and a third color component, wherein each of the first color component, the second color component, and the third color component is associated with the start location;

determine, based on the determined first color component, a first axis co-ordinate associated with the selected sub-region;

determine, based on the determined second color component, a second axis co-ordinate associated with the selected sub-region;

select a sub-region for each pixel stream of the received set of pixel streams based on each of the determined first color component, the determined second color component, the determined third color component, the determined first axis co-ordinate, and the determined second axis co-ordinate;

determine, based on the selected sub-region, a fingerprint value associated with a respective pixel stream of the received set of pixel streams; and store the determined fingerprint value on a storage device associated with the electronic device.

7. The electronic device according to claim 6, wherein a size of the selected sub-region is based on the determined third color component.

8. The electronic device according to claim 6, wherein a size of the selected sub-region corresponds to an offset of the selected start location within the image.

9. The electronic device according to claim 6, wherein the circuitry is further configured to:

determine a set of color components associated with each pixel of a specific number of a plurality of pixels in the selected sub-region, for the respective pixel stream of the received set of pixel streams; and determine the fingerprint value for the respective pixel stream of the received set of pixel streams based on the determined set of color components associated with the specific number of the plurality of pixels in the selected sub-region.

10. The electronic device according to claim 6, wherein the media content is at least one of pre-recorded video content, live video content, or image content.

11. The electronic device according to claim 6, wherein the image is verifiable based on the stored fingerprint value.

12. The electronic device according to claim 6, wherein the selected sub-region corresponds to a fractal-geometry associated with the image.

13. A method, comprising:

in an electronic device:

receiving a set of data streams associated with media content, wherein each data stream of the received set of data streams corresponds to a specific number of a plurality of contiguous data chunks of the media content;

generating a rectangular media frame based on the received set of data streams;

determining a set of first attributes associated with each contiguous data chunk of the plurality of contiguous data chunks for each data stream of the received set of data streams;

selecting, based on the determined set of first attributes, a sub-region from the generated rectangular media frame for a respective data stream of the received set of data streams, wherein the selection of the sub-region is repeated a specific number of times based on a specific rule to create a fractal-geometry associated with the generated rectangular media frame, and the selected sub-region corresponds to the fractal-geometry associated with the generated rectangular media frame;

determining, based on the selected sub-region, a fingerprint value associated with the respective data stream of the received set of data streams; and storing the determined fingerprint value on a storage device associated with the electronic device.

14. The method according to claim 13, further comprising selecting the sub-region based on at least one of:

an offset from a start location in the generated rectangular media frame, a length of the sub-region in the generated rectangular media frame, or a width of the sub-region in the generated rectangular media frame.

15. The method according to claim 13, wherein the media content includes at least one of audio content, video content, image content, or textual content.

16. The method according to claim 13, further comprising:

determining a set of second attributes associated with a specific number of a plurality of data chunks for the respective data stream of the received set of data streams, wherein the specific number of the plurality of data chunks is associated with the selected sub-region; and determining the fingerprint value for the respective data stream based on the determined set of second attributes.

17. The method according to claim 13, wherein the media content is verifiable based on the stored fingerprint value.

* * * * *